United States Patent
Han et al.

(10) Patent No.: US 7,164,519 B2
(45) Date of Patent: Jan. 16, 2007

(54) LASER PROCESSING APPARATUS AND METHOD USING POLYGON MIRROR

(75) Inventors: You-Hie Han, Daejeon-si (KR); Eun-Jeong Hong, Gyeonggi-do (KR)

(73) Assignee: EO Technics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/982,091

(22) Filed: Nov. 4, 2004

(65) Prior Publication Data

US 2006/0039057 A1   Feb. 23, 2006

(30) Foreign Application Priority Data

Aug. 18, 2004   (KR) .................... 10-2004-0065066

(51) Int. Cl.
*G02B 26/08* (2006.01)
(52) U.S. Cl. .................................................... 359/216
(58) Field of Classification Search ................ 359/216
See application file for complete search history.

(56) References Cited

U.S. PATENT DOCUMENTS

| 3,465,347 A | 9/1969 | Hudson |
| 4,978,184 A | 12/1990 | Straayer |
| 5,103,074 A * | 4/1992 | Watanabe et al. ...... 219/121.68 |
| 5,254,833 A | 10/1993 | Okiyama |
| 5,539,441 A | 7/1996 | Appel et al. |
| 5,632,083 A | 5/1997 | Tada et al. |
| 2003/0184835 A1 | 10/2003 | Goldberg et al. |

FOREIGN PATENT DOCUMENTS

| EP | 1 08 821 | 3/2001 |
| EP | 1080821 | 3/2001 |
| EP | 1586406 | 10/2005 |
| JP | 52-034750 | 3/1977 |
| JP | 01-306088 | 12/1989 |
| JP | 01-316415 | 12/1989 |
| JP | 2002-018581 | 1/2002 |

* cited by examiner

*Primary Examiner*—Euncha P. Cherry
(74) *Attorney, Agent, or Firm*—Ladas & Parry LLP

(57) ABSTRACT

Disclosed is a laser processing apparatus and method for enhancing processing efficiency of an object by means of a polygon mirror. The laser processing apparatus includes a laser generator outputting a laser beam with a predetermined diameter, a polygon mirror rotating on an axis with plural reflection planes to reflect the laser beam incident on the reflection planes from the laser generator, in which the number of the reflection planes is set in order that the laser beam can cover at least two reflection planes of the polygon mirror, and a lens condensing and irradiating the laser beam reflected from the polygon mirror. According to the present invention, it is able to improve the processing efficiency and product yield of an object by dividing the laser beam into the plurality to be incident on the reflection planes of the polygon mirror and repeatedly processing the object in low energy by means of the divided laser beam.

4 Claims, 11 Drawing Sheets

LASER PROCESSING APPARATUS AND METHOD USING POLYGON MIRROR

CROSS-REFERENCE TO RELATED APPLICATIONS

This U.S. non-provisional patent application claims priority under 35 U.S.C. § 119 of Korean Patent Application 2004-65066 filed on Aug. 18, 2004, the entire contents of which are hereby incorporated by reference.

BACKGROUND OF THE INVENTION

The present invention relates to a laser processing apparatus and method, and more specifically, to a laser processing apparatus and method for enhancing processing efficiency of an object by means of a polygon mirror.

In producing objective materials from wafers, metals, plastics, and so on, it is general to operate processing procedures such as cutting and grooving works. For instance, after completing a semiconductor chip fabrication process, a process for cutting a wafer to separate plural chips, which are formed on the wafer, into individual chips is subsequent thereto. The wafer cutout operation is very important over the whole process of semiconductor chips because it heavily affect the productivity and product quality in the subsequent process. The wafer cutout operation is usually carried out with a mechanical cutout method or a method employing a laser beam. Especially, a processing apparatus using a laser beam is being highly studied because it has more advantageous than a mechanical apparatus.

A method of cutting a wafer by a laser beam uses a mechanism of burning irradiated areas out of the wafer due to inducing thermal and chemical effects by focusing the laser beam on a surface of the wafer in the range of high ultraviolet rays 250~360 nm. In other words, when a laser beam condensed is irradiated on a wafer, the irradiated area is heated up instantly and then evaporated, melting as well, with increasing a vaporizing pressure according to the evaporation of the wafer material, resulting in an explosive burning-out of the irradiated area. From a successive sequence of the burning-out operations, a wafer can be divided into multiple chips and a linear or curved severing process is available therein along a moving passage.

The most advanced one among laser processing apparatuses is carried out by cutting a wafer with guidance by water ejected from a high-pressure water jet nozzle, irradiating a laser beam simultaneously. However, such an apparatus has a disadvantage of changing the nozzle in a period because the water jet nozzle is easily worn out mechanically due to the high pressure, which results in degrading the productivity and raising the costs as well as causing a nuisance in operating the process.

As one of techniques to overcome the defect in laser processing apparatuses at present, the method of employing a polygon mirror has been proposed in Korean Application No. 2004-0022270 filed on Mar. 31, 2004 by the present applicant. The polygon mirror rotates with plural reflection planes that have the same length each other, as illustrated in FIG. 1.

FIG. 1 is a diagram illustrating a laser processing method with a polygon mirror.

As shown in FIG. 1, the laser processing apparatus with the polygon mirror includes a polygon mirror 10 rotating on an axis 11 with plural reflection planes 12, and a lens 20 condensing a laser beam reflected on the reflection plane 12 of the polygon mirror 10. Here, while the lens 20 may be implemented with a telecentric f-theta lens installed in parallel with a stage 30 on which an object 40 (e.g., a wafer) to be cut out is settled. And it may be implemented with plural lenses as well, but FIG. 1 shows a sheet of lens for convenience' sake.

Along the rotation of the polygon mirror 10, the laser beam is reflected on the front of the reflection plane 12 as shown in FIG. 1A and then incident on the left end of the lens 20. The reflected laser beam is condensed on the lens 20 and then perpendicularly irradiated onto a designated position S1 of the object 40.

Continuously, as illustrated in FIG. 1B, according to further rotation of the polygon mirror, the laser beam is reflected on the center of the reflection plane 12 and then incident on the center of the lens 20. The incident laser beam is condensed on the lens 20 and then perpendicularly irradiated onto a designated position S2 of the wafer 40.

Next, as shown in FIG. 1C, the polygon mirror more rotates to make the laser beam reflected on the rear of the reflection plane 12. The reflected laser beam is incident on the right end of the lens 20 and then condensed on the lens 20 to be perpendicularly irradiated onto a designated position S3 of the wafer 40.

As such, the laser beam is irradiated onto the positions from S1 to S3 on the wafer 40 along the rotation of the polygon mirror. The range from S1 to S3 is referred to as a scanning length $S_L$ processed by the reflection plane 12 of the polygon mirror 10. In addition, an angle set by the laser beams each reflected on the front and rear of the reflection plane 12 is referred to as a scanning angle θ.

In the laser processing apparatus with the polygon mirror stated above, the laser beam is irradiated on the object with energy about 10 W. But, it may occur that excessive irradiation of the laser beam onto the same position of the object damages the object to degrade the reliability of the process.

Moreover, as it is conventional to use a laser beam with a predetermined diameter other than a pointing beam, the laser beam incident on the corners of the reflection plane may be partially dissipated (or lost in energy). Such energy loss due to dissipation of the laser beam is described with reference to FIG. 2 as follows.

FIG. 2 is a diagram illustrating the phenomenon of the energy loss at the corners of reflection planes of the polygon mirror.

As shown in FIG. 2, while applying the laser beam to the polygon mirror 10 that is rotating, if the laser beam with a fixed diameter is incident on the corner of the reflection plane 12, a part of the laser beam, an energy-reduced laser beam A, is reflected on the reflection plane 12 and applied to the lens 20. However, the other part of the laser beam, a lost laser beam B, is scattered on the reflection plane 12' and thereby is not applied to the lens 20.

Therefore, the lens 20 condenses the energy-reduced laser beam A only to irradiate it to the object 40 mounted on the stage 30. As a result, there are differences in the processing efficiency between the area of the object exposed to the laser beam reflected on the corner of the reflection plane 12 and the other areas. It causes an irregular processing profile to result in the degradation of the processing reliability. Moreover, as the energy of the laser beam is dissipated at the corners, the resources are wasted.

SUMMARY OF THE INVENTION

The present invention is directed to solve the aforementioned problems, providing a laser processing apparatus and method, using a polygon mirror, for preventing a laser beam from being excessively irradiated on an object.

The present invention is also directed to enhance the processing efficiency of an object by preventing an energy loss at the corners of a polygon mirror in a laser processing apparatus.

In order to accomplish the above objects of the present invention, a laser processing apparatus processing an object by a laser beam includes: a laser generator emitting a laser beam with a predetermined diameter; a polygon mirror rotating on an axis with plural reflection planes and reflecting the laser beam emitted from the laser generator on the reflection planes whose number is adjusted to make more than two reflection planes be covered by laser beam; and a lens condensing the laser beam reflected on the polygon mirror and irradiating the laser beam on the object.

The present invention also provides a processing method using a polygon mirror rotating on an axis, which comprises plural reflection planes of the same length for reflecting the laser beam of a predetermined diameter emitted from a laser generator, wherein the number of the reflection planes is established so that the incident laser beam should cover more than two reflection planes, the method comprising: settling the object on a stage; establishing control parameters including a rotating velocity of the polygon mirror and a transfer velocity of the stage; rotating the polygon mirror on an axis with the predetermined rotating velocity; moving the stage with the predetermined transfer velocity; irradiating the laser beam on the reflection planes, covering more than two reflection planes whose number is established to be covered by the laser beam; and condensing divisions of the laser beam on a lens and irradiating the condensed laser beam on the object.

The present invention processes an object by repeated irradiation of divided laser beams which have low energy, taking advantage of energy reduction due to laser beam division at the corners of the polygon mirror, which prevents damages of the object. In addition, the dissipation or loss of the laser beam due to the division is prevented by increasing the number of the reflection planes of the polygon mirror to enable the divided laser beams to be condensed on the lens.

BRIEF DESCRIPTION OF THE DRAWINGS

The accompanying drawings are to provide further understanding of the invention, and are incorporated in and constitute a part of this specification. The drawings illustrate desirable embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the invention to those skilled in the art. Like numerals refer to like elements throughout the specification.

Hereinafter, it will be described about an exemplary embodiment of the present invention in conjunction with the accompanying drawings.

Figure 1A:
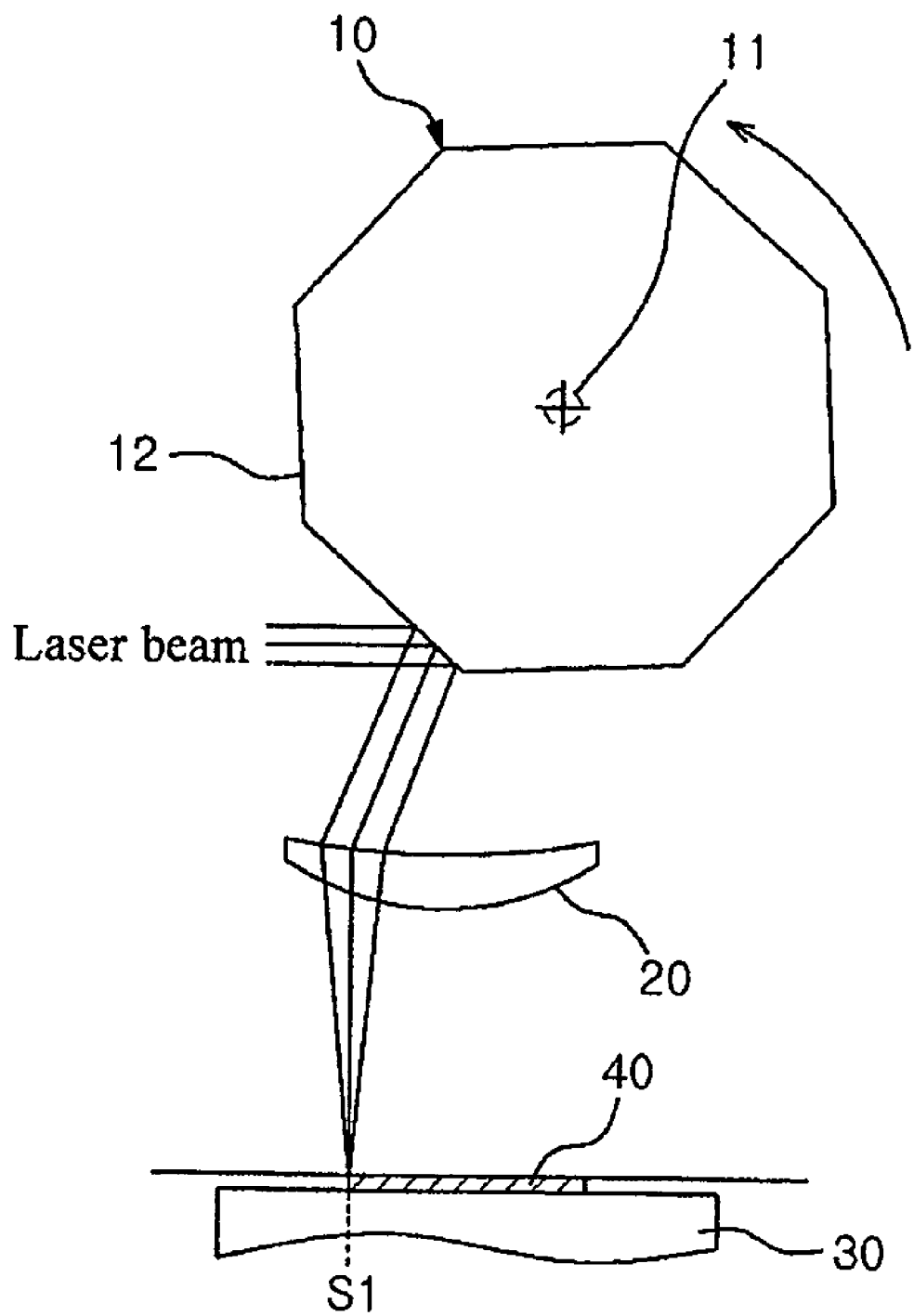
FIGS. 1A through 1C are diagrams illustrating a laser processing method with a polygon mirror.
Figure 1B:
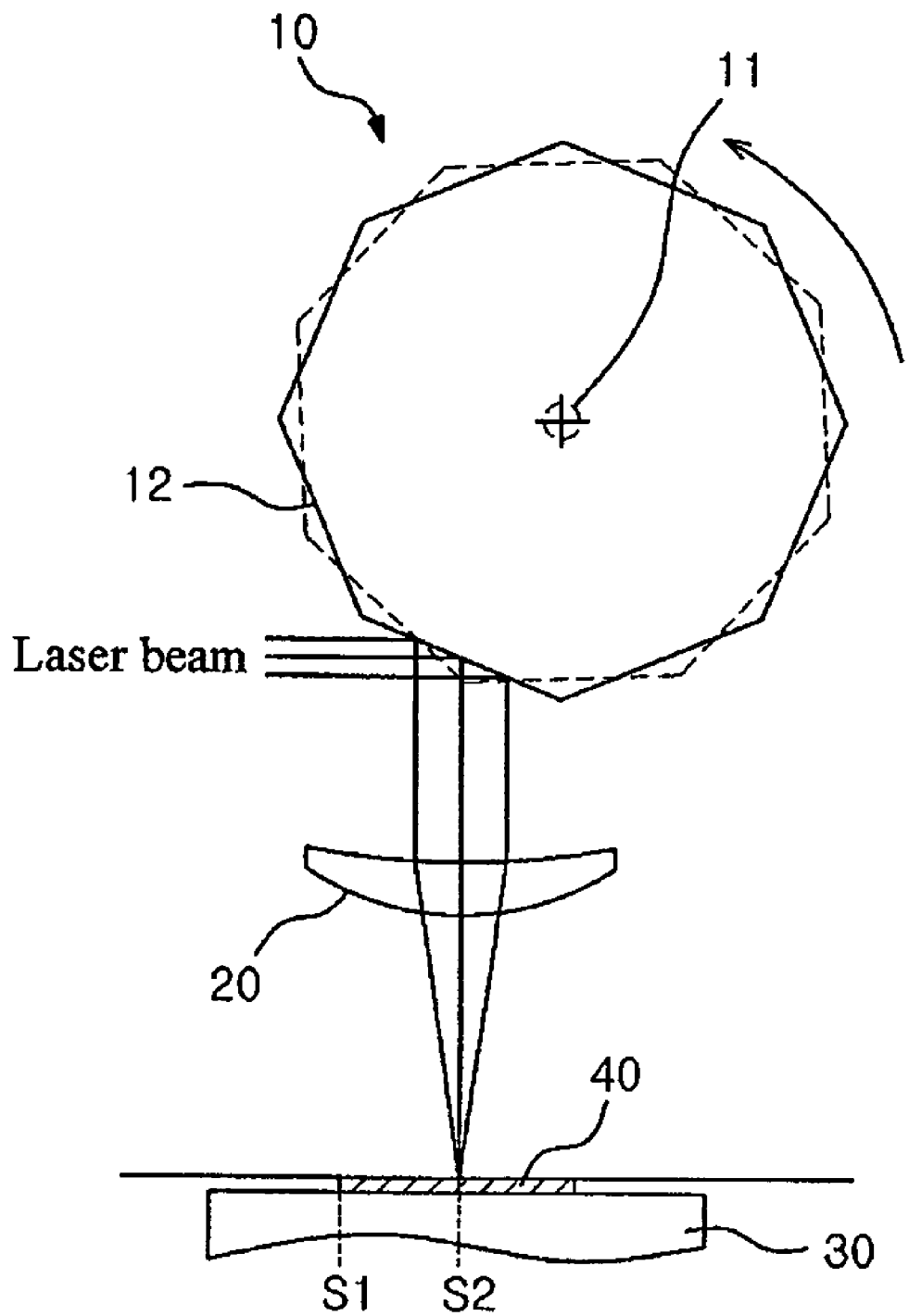
Figure 1C:
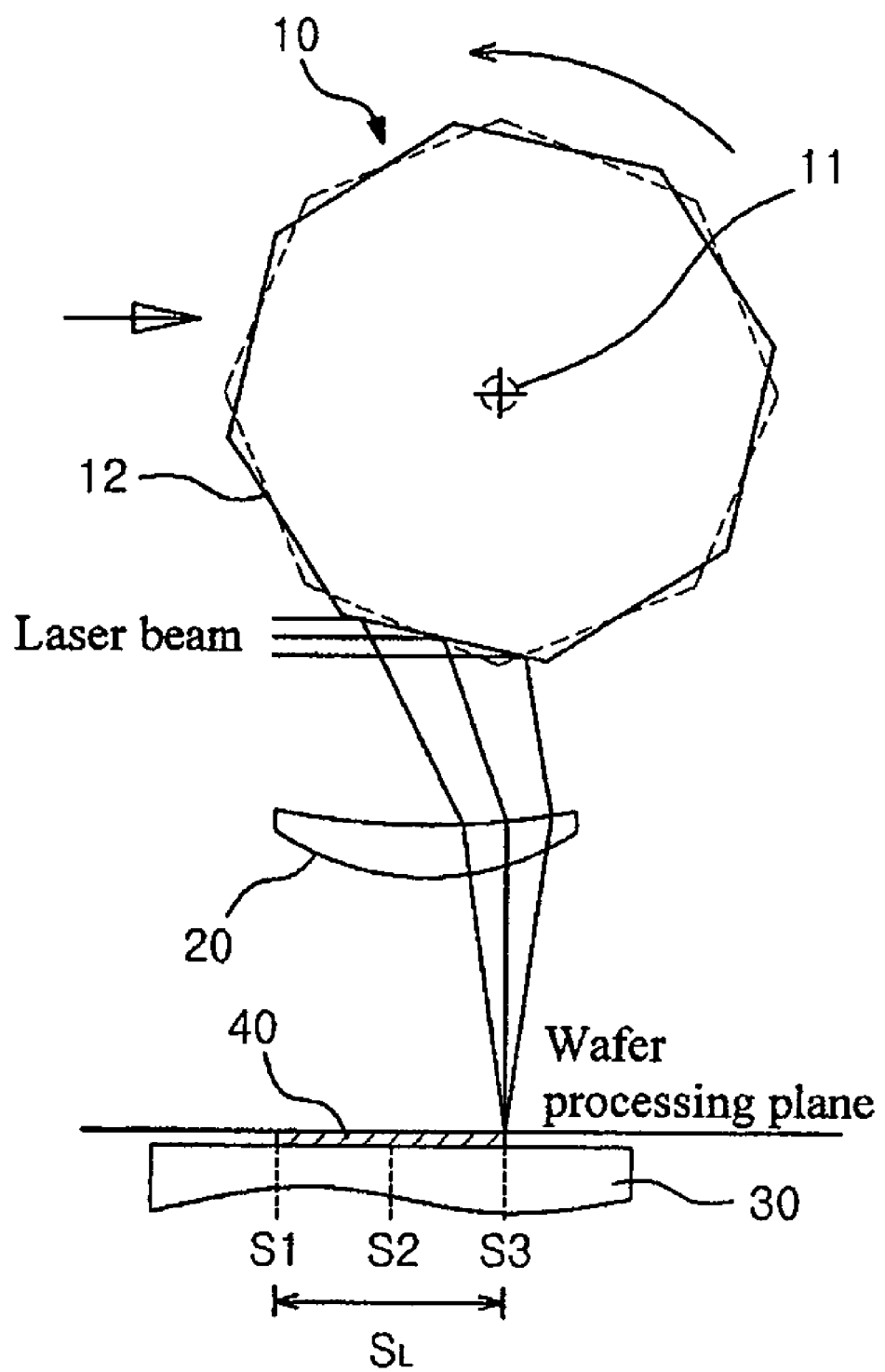
Figure 2:
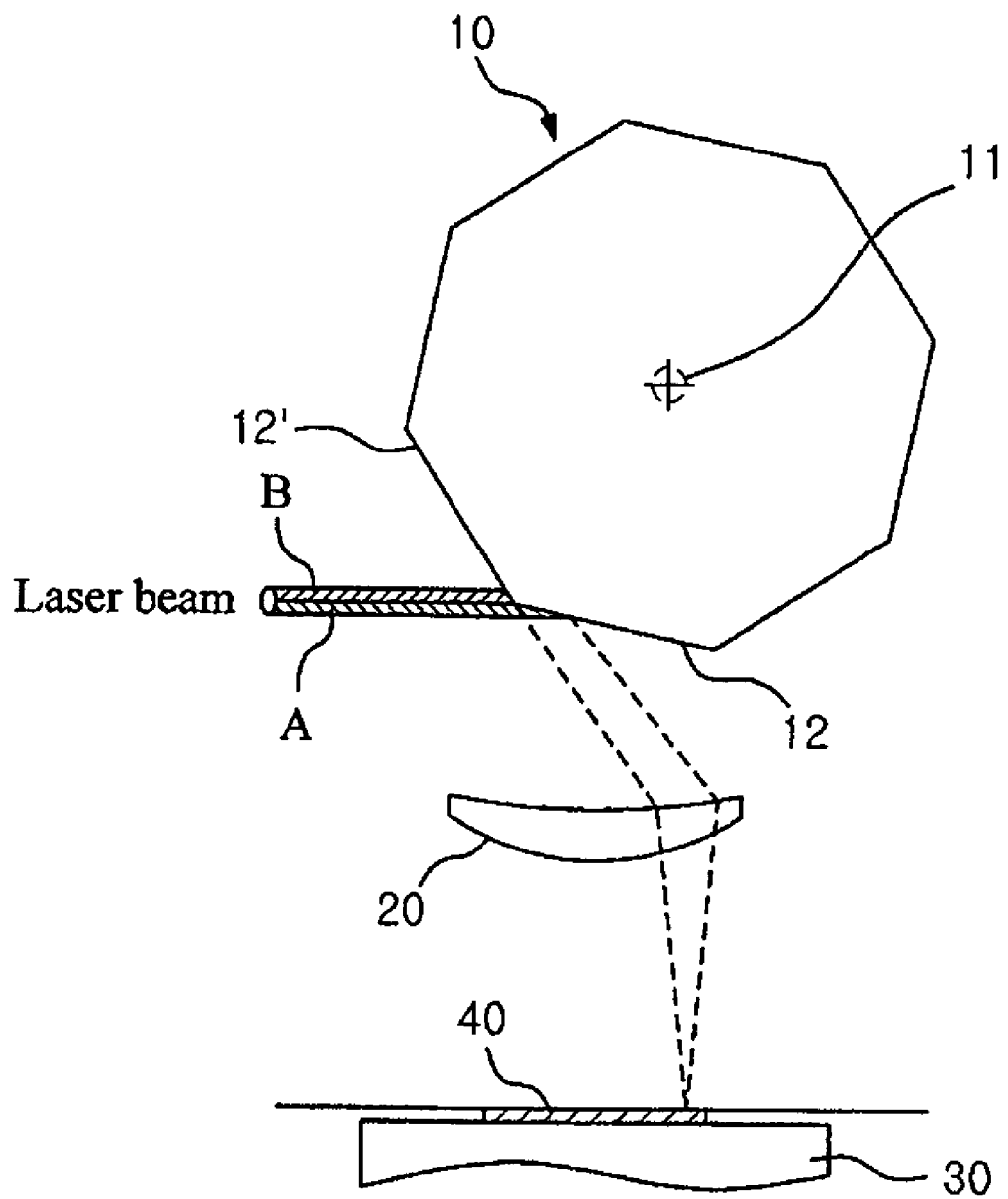
FIG. 2 is a diagram illustrating the phenomenon of energy loss at the corners of reflection planes of the polygon mirror.
Figure 3A:
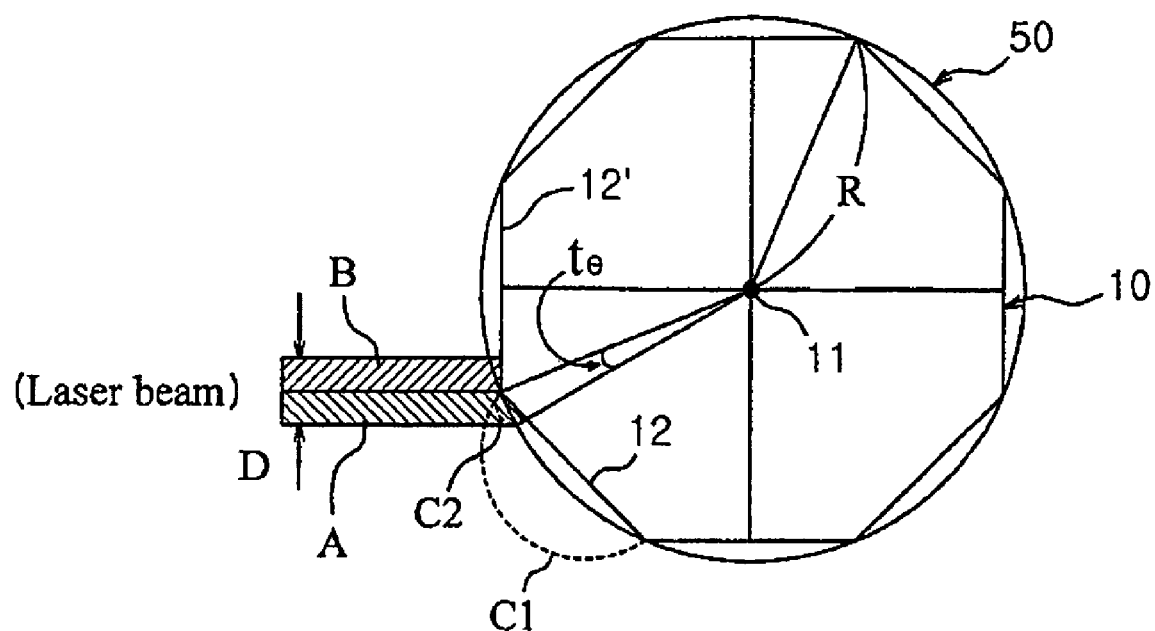
FIGS. 3A and 3B are diagrams illustrating the phenomenon of energy loss in the polygon mirror in an irradiation of a laser beam.
Figure 3B:
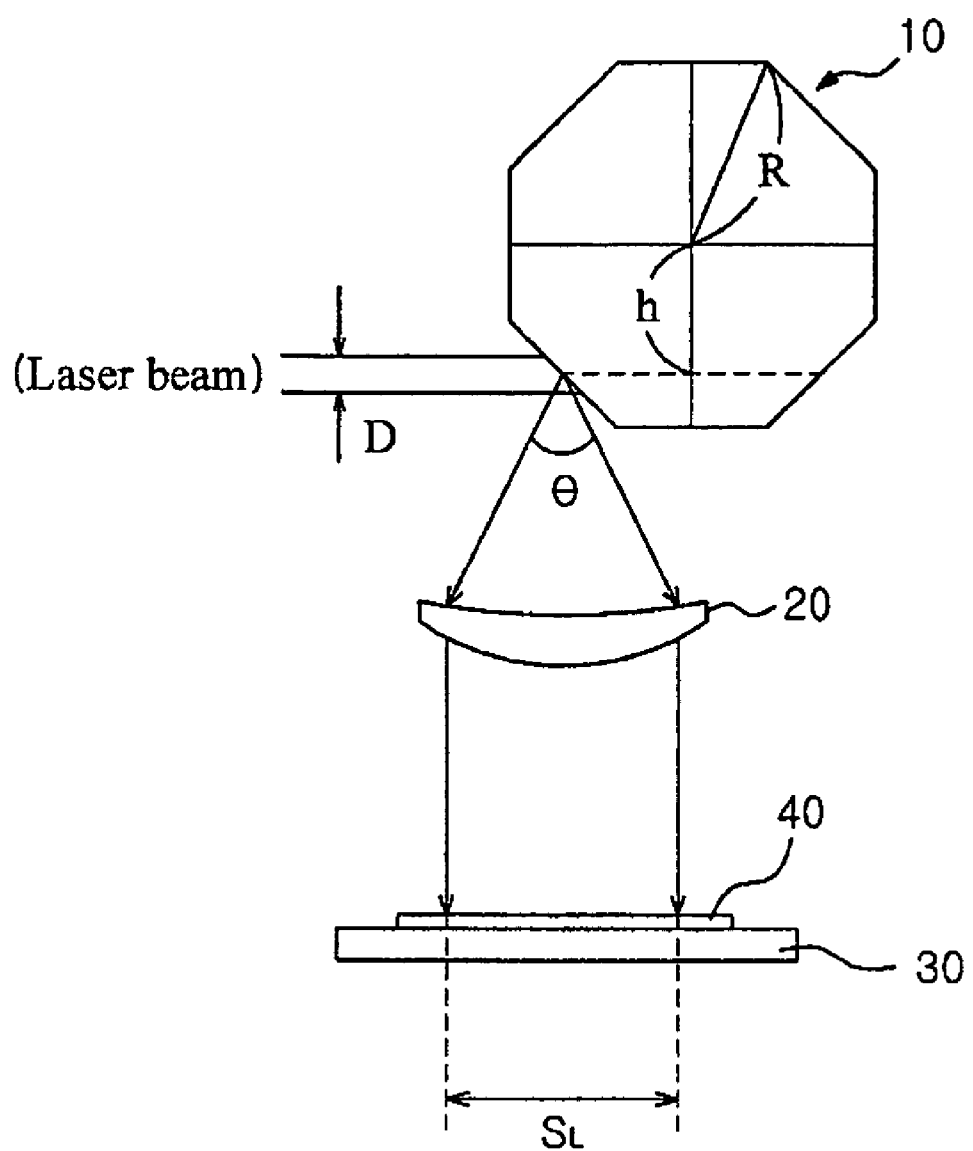

FIGS. 3A and 3B are diagrams illustrating the phenomenon of energy loss in the polygon mirror in an irradiation of a laser beam.

Referring to FIG. 3A, when a laser beam with a predetermined diameter D is incident and reflected on a corner of the reflection plane 12 of the polygon mirror 10, a part of the laser beam (i.e., the energy-reduced laser beam A) is incident on the reflection plane 12 while the other of the laser beam (i.e., the lost laser beam B) is incident on the reflection plane 12'.

In the meantime, in order to evaluate a ratio of the scanning length $S_L$ by the energy-reduced laser beam A to the scanning length by the whole reflection plane of the polygon mirror, a loss angle $t_\theta$ is established which is formed between a segment from the corner to the center of the polygon mirror (i.e., the axis 11) and a segment from the axis 11 to a point where the energy-reduced laser beams meets with the circumcircle of the polygon mirror.

Next, a ratio arising from the portions of loss for one reflection plane of the polygon mirror having the N reflection planes, i.e., a loss rate, is evaluated by the way as follows.

From FIG. 3A, an arc length of a fan-shaped plane that is defined by the axis and both points where the circumcircle meets with the corners of the reflection plane, i.e., an arc length C1 corresponding to the reflection plane on which the laser beam is irradiated is obtained by the following Equation 1.

$$C1 = \frac{2\pi R}{N} \quad \text{[Equation 1]}$$

And, an arc length C2 for the portion of the loss angle is obtained by the following Equation 2 where C2 is the maximum value.

$$C2 = Rt_\theta \quad \text{[Equation 2]}$$

The arc length C2 for the loss angle is variable according to the rotation of the polygon mirror 10. When the laser beam is irradiated on the reflection plane without including the corners, the loss rate becomes 0 because there is no loss of energy in the laser beam. However, when the laser beam begins to be irradiated on the reflection plane with the corner included, the loss rate gradually increases up to the maximum value of Equation 2 and then gradually decreases down again.

The loss rate $t_r$ which is the percentage rate of the amount of energy loss to the total energy reflected on the whole reflection plane can be obtained by the following Equation 3.

$$t_r = \frac{C2}{C1} = \frac{t_\theta N}{2\pi} \times 100(\%) \quad \text{[Equation 3]}$$

In addition, the loss angle $t_\theta$ may be calculated by the following Equation 4 and a vertical height h from the center of the polygon mirror to the center of the laser beam irradiated on the reflection plane is obtained by the following Equation 5.

$$t_\theta = \arccos\left[1 - \frac{1}{2R^2}\left\{\sqrt{R^2 - (R-h)^2} - \sqrt{R^2 - (R-h-D)^2} + D^2\right\}\right] \quad \text{[Equation 4]}$$

$$h = R \times \sin\left(\frac{\pi}{4} - \frac{\pi}{N}\right) \quad \text{[Equation 5]}$$

In the above Equations, the parameter R denotes a radius of the circumcircle of the polygon mirror. In the meantime, as illustrated in FIG. 3B, the scanning angle θ on the reflection plane of the polygon mirror for the laser beam incident thereon is obtained by the following Equation 6.

$$\theta = \frac{4\pi}{N} \quad \text{[Equation 6]}$$

The following Table 1 arranges the relations between the loss rates and the number of laser beams divided on the reflection plane of the polygon mirror. In case of the loss rate is below 100%, C2 is smaller than C1. That means that, laser beam is covering just one reflection plane. And, in case of the loss rate is over 100%, C2 is larger than C1. That means that, laser beam is covering more than two reflection planes.

TABLE 1

| Loss rate ($t_r$, %) | The number of laser beam divided |
|---|---|
| 0~99 | 1~2 |
| 100~199 | 2~3 |
| 200~299 | 3~4 |
| . | . |
| . | . |
| . | . |

When the loss rate ranges from 0 to 99, the laser beam is divided into one or two sections after being incident on the reflection plane of the polygon mirror. When the loss rate ranges from 100 to 199, the laser beam is divided into two or three sections. When the loss rate ranges from 200 to 299, the laser beam is divided into three or four sections. That is, as the loss rate becomes higher, the number of the divided laser beams becomes larger. The division of the laser beam into two or three corresponds to the condition that the laser beam is incident with the diameter D to cover two corners of the reflection planes of the polygon mirror, while the division of the laser beam into three or four corresponds to the condition that the laser beam is incident with the diameter D to cover three corners of the reflection planes of the polygon mirror.

In the above, the division of the laser beam into two sections is caused because the laser beam is reflected on the corner of the reflection plane in accordance with the rotation of the polygon mirror, that it is not valid division of the laser beam, rather than the case of the division of the laser beam into 2~3 sections or 3~4 sections.

As can be seen from Equations 3 through 5, the loss rate, i.e., the number of laser beams divided increases as the number of the reflection planes, N, or the diameter of the laser beam, D, increases, or as the radius R of the circumcircle of the polygon mirror decreases. Further, as represented by Equation 5, since the scanning angle on the reflection plane of the polygon mirror becomes smaller in accordance with an increase of the number N of the reflection planes, it is able to condense all of laser beams divisionally reflected on the reflection plane of the polygon mirror with in the lens 20.

As such, an effect of irradiating the laser beams simultaneously in multiple times on the same processing plane with low energy when the laser beam is divisionally applied to the object. It can enhance the yields of product as well as the processing quality of object.

In other words, while a conventional laser processing apparatus has the problem of damaging an object due to excessive irradiation of the laser beam on the same processing position when the laser beam is applied to the processing plane with the energy about 10 W, the proposed laser processing apparatus of the present invention is advantageous to improving the processing efficiency by irradiating the laser beam in multiple times simultaneously on the same processing plane with low energy, as well as effectively removing impurities or vapor generated therein during the process with the laser beam, because the polygon mirror of the present invention enables the energy to be divided as much as the number of the divided laser beams and the effect of multiple irradiation times by the laser beam in low power.

Figure 4:
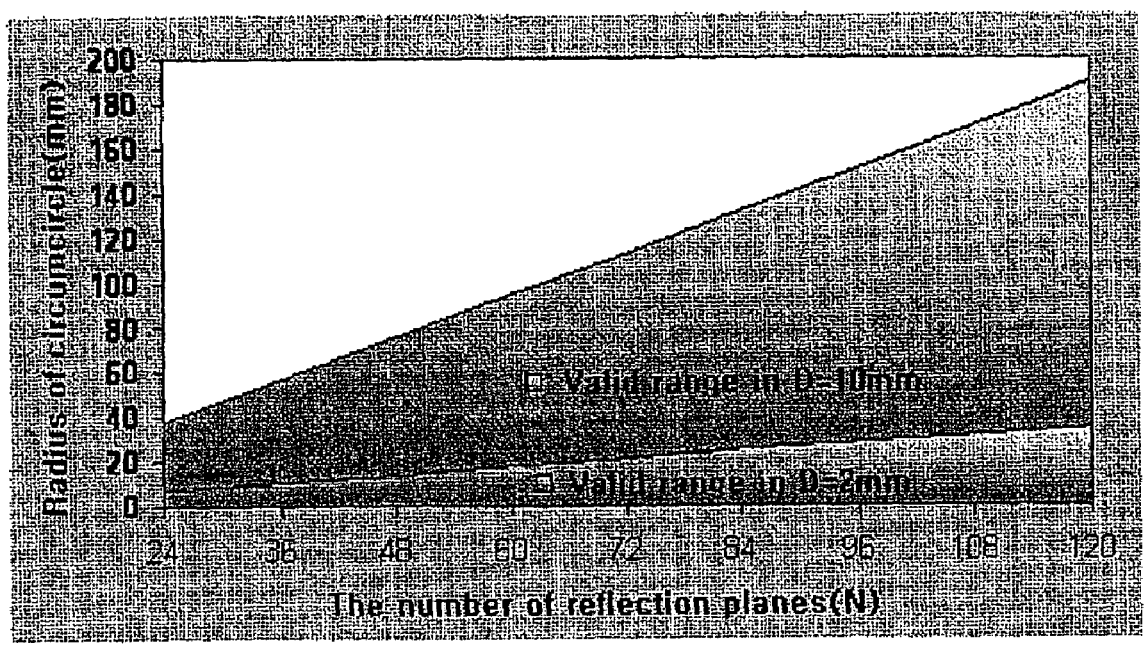
FIG. 4 is a graph depicting the relation between the radius of the circumcircle of the polygon mirror and the number of reflection planes of the polygon mirror with reference to the diameter of the laser beam.

FIG. 4 is a graph depicting the relation between the radius of the circumcircle of the polygon mirror and the number of reflection planes of the polygon mirrors with reference to the diameter of the laser beam, which is summarized in the following Table 2.

TABLE 2

| Number of reflection planes(N) | Radius of circumcircle (D = 10 mm) | Radius of circumcircle (D = 2 mm) |
|---|---|---|
| 24 | 38 | 7 |
| 36 | 57 | 11 |
| 48 | 76 | 14 |
| 60 | 95 | 18 |
| 72 | 113 | 21 |
| 84 | 132 | 25 |
| 96 | 151 | 28 |
| 108 | 169 | 32 |
| 120 | 190 | 35 |

The practical values listed in Table 2 represent various sampling standards of the polygon mirror to implement the performance with the loss rate over 100% on each reflection plane thereof, which are obtained by Equations 3 and 4, when the number of the reflection planes and the radius of the circumcircle of the polygon mirror vary for the laser beam with a predetermined diameter.

Referring to FIG. 4 and Table 2, in the condition that the diameter of the laser beam is 10 mm and the number of the reflection planes is 24, the loss rate becomes over 100% only when the radius of the circumcircle is less than 38 mm. Otherwise, when the number of reflection planes is 120 with the same laser beam diameter of 10 mm, the loss rate can be over 100% to result in the effective beam division only if the radius of the circumcircle is less than 190 mm.

On the other side, in the condition that the diameter of the laser beam is 2 mm and the number of the reflection planes is 96, the loss rate goes over 100% to result in the effective beam division only if the radius of the circumcircle is less than 28 mm.

Although FIG. 4 and Table 2 show examples with the cases that the number of the reflection planes ranges from 24 to 120, it does not limit the embodiments thereto and any other polygon mirror that is proper to accomplish the loss rate over 100% can be used with consideration of the relations among the number of the reflection planes, the radius of the circumcircle, the diameter of the laser beam, and the loss rate.

Figure 5:
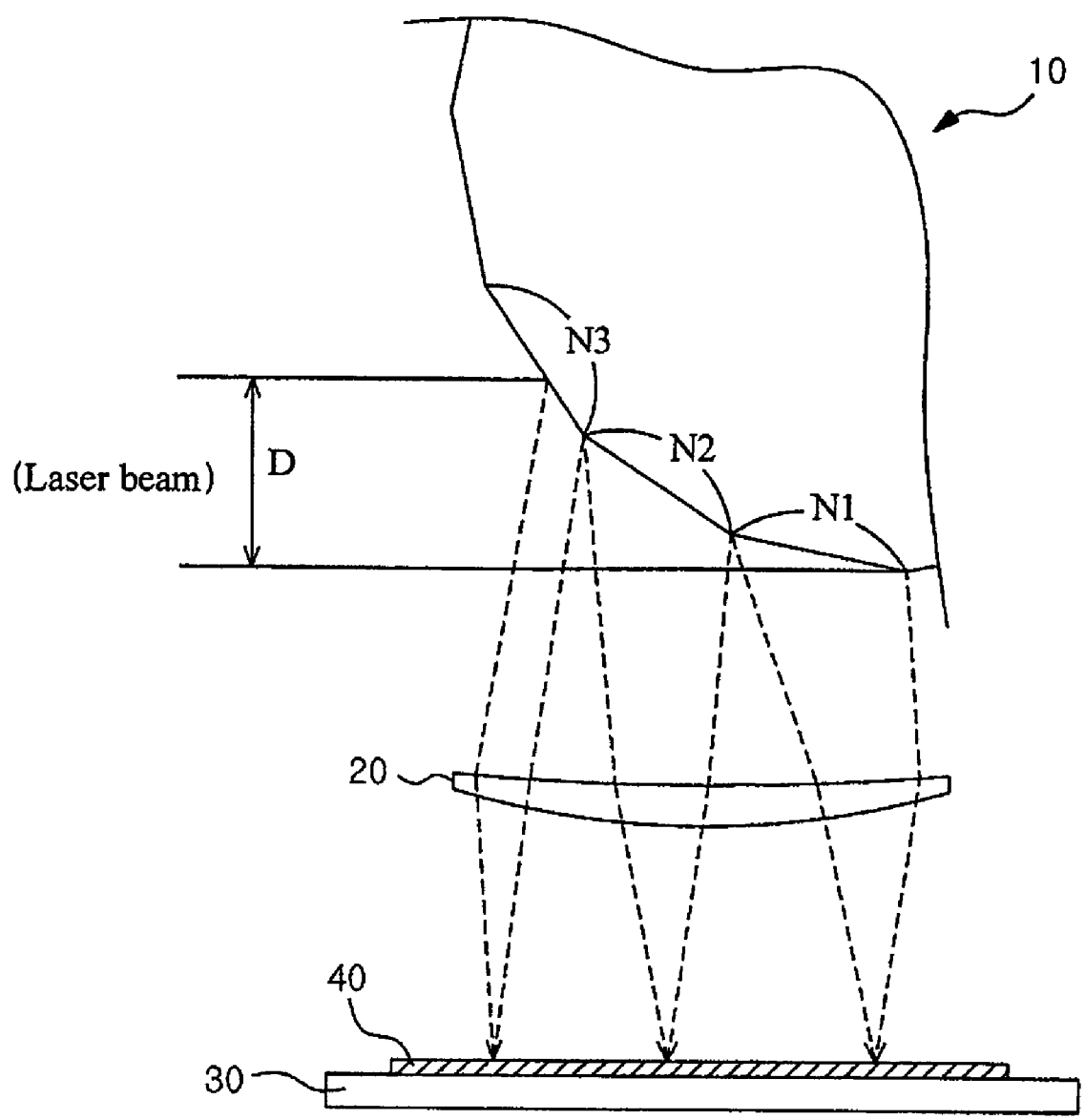
FIG. 5 is a diagram illustrating the processing an object by means of a polygon mirror according to the present invention.

FIG. 5 is a diagram illustrating processing an object by means of the polygon mirror according to the present invention.

As shown in FIG. 5, the laser beam with the predetermined diameter D is irradiated to the polygon mirror having plural reflection planes. For this, the polygon mirror is exemplarily designed to accept the laser beam on three reflection planes in coverage, which enables the loss rate to be ranged from 100% to 199% by adjusting the number of the reflection planes.

Once the laser beam with the predetermined diameter is applied to the polygon mirror, it covers the whole surfaces of reflection planes N1 and N2 and a part of a reflection plane N3. The laser beam incident on the reflection plane N1 is condensed on the lens 20 and then irradiated on the object 40 (i.e., the wafer) mounted on the transfer unit 30. According to the rotation of the polygon mirror, the object 40 is processed in the range of the scanning angle from the reflection plane N1. Other incident laser beams on the reflection planes N2 and a part of N3 are irradiated on the object 40 in the same manner.

As such, when the object is processed by a laser beam with a predetermined diameter other than a pointing laser beam, it is possible to adjust the number of the reflection planes, to make the incident laser beam cover plural reflection planes and thereby divided into plural beams. As a result, the divided laser beams provide an effect of processing the object by multiple laser beams at the same time.

Now, it will be described about the laser processing apparatus employing the polygon mirror according to the present invention.

Figure 6:
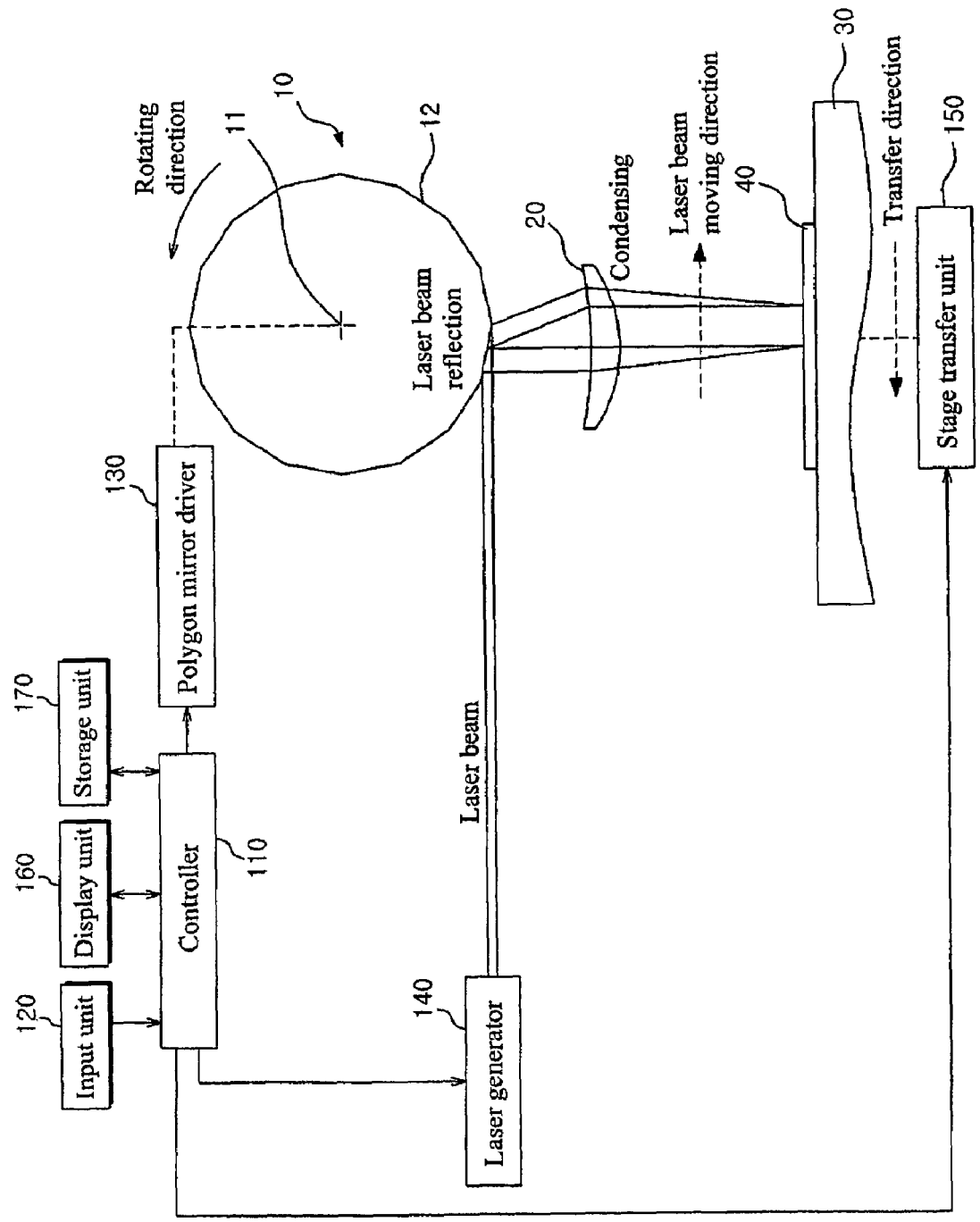
FIG. 6 is a structural diagram of a laser processing apparatus with a polygon mirror in accordance with an embodiment of the present invention.

FIG. 6 is a structural diagram of the laser processing apparatus with the polygon mirror in accordance with an embodiment of the present invention.

As illustrated in FIG. 6, the laser processing apparatus with the polygon mirror is comprised of a controller 110 for operating an overall process, an input unit 120 for receiving control parameters and commands, a polygon mirror driver 130 for actuating the polygon mirror, a laser generator 140 for emitting a laser beam in a predetermined diameter, a stage transfer unit 150 for moving the stage 30, on which the object 40 such a wafer is mounted, in a predetermined processing direction, a display unit 160 for showing information about operating conditions, and a storage unit 170 for storing data. Here, the polygon mirror is designed with the proper number of the reflection planes in order to make the laser beam, which is emitted from the laser generator 140, cover more than two reflection planes, in reference to the diameter of the laser beam and the radius of the circumcircle proper to the laser processing apparatus. In other words, the number of the reflection planes is adjusted to keep the loss rate over 100%.

The polygon mirror driver 130 is provided to rotate the multi-sided polygon mirror 10 on the axis 11 with a predetermined velocity, using a motor (not shown) regulated by the controller 110.

The laser generator 140 emits the laser beam to process the object 40 mounted on the stage 30, e.g., emitting an ultra violet laser. The stage transfer unit 150 moves the stage 30, on which the object 40 is mounted, with a predetermined velocity.

In the structure of the laser processing apparatus, the laser beam emitted from the laser generator 140 is incident on the polygon mirror 10 by the controller 110. During this, the laser beam is irradiated with a diameter enough to cover more than two reflection planes of the polygon mirror 10 and then applied toward the lens 20 from each reflection plane of the polygon mirror 10. The lens 20 condenses the laser beam to irradiate it to the object 40 in a vertical direction.

When the reflection plane of the polygon mirror 10 is rotating, the laser beam applied to the object 40 is irradiated with moving by the scanning length along the reverse of the transfer direction.

Figure 7:
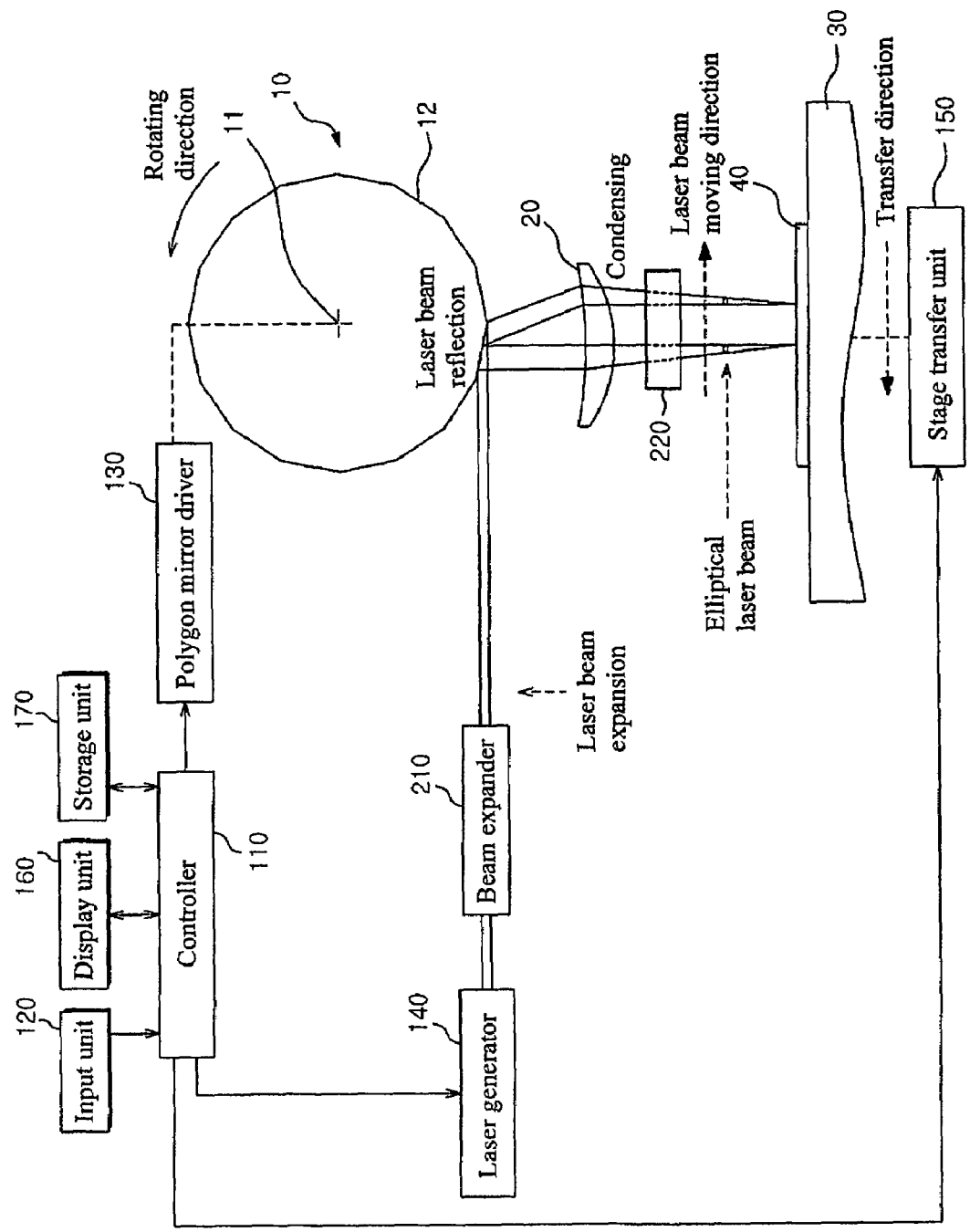
FIG. 7 is a structural diagram of a laser processing apparatus with a polygon mirror in accordance with another embodiment of the present invention.

FIG. 7 is a structural diagram of the laser processing apparatus with the polygon mirror in accordance with another embodiment of the present invention.

The laser processing apparatus shown in FIG. 7 further includes a beam expander 210 and a beam transformer 220 in addition to the components of the laser apparatus shown in FIG. 6. The beam expander 210 enlarges a diameter of the laser beam emitted from the laser generator 140 and then irradiates the enlarged laser beam on the polygon mirror 10 to cover more than two reflection planes. The beam transformer 220 converts the laser beam, which is condensed on the lens 20 after being reflected from the polygon mirror 10, into an elliptical pattern. Here, the beam transformer 220 may be implemented by employing a cylindrical lens.

With addition of the beam expander 210 and the beam transformer 220, the laser beam is irradiated on the object 40 with the elliptical pattern in section, and a major axis of the elliptical section should be aligned with the processing direction while a minor axis of the elliptical section corresponds to the width of cutout processing.

By irradiating the laser beam thereon with the elliptical pattern, a processing plane of the object 40 is set to have an enough slope, which makes refuge and vapor, which are generated during the process, be easily discharged to the external without recasting on the processing plane.

Figure 8:
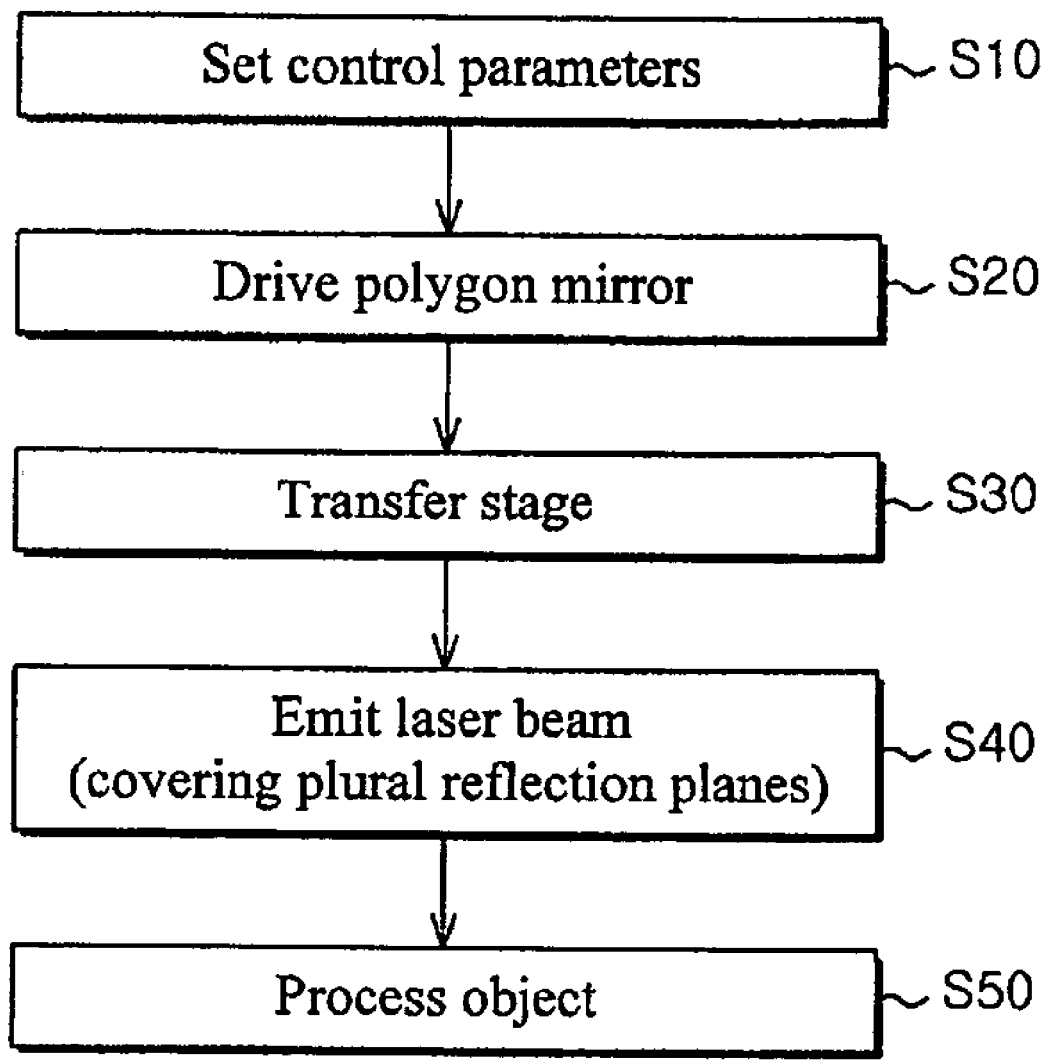
FIG. 8 is a flow chart of the laser processing method by means of the polygon mirror according to the present invention.

FIG. 8 is a flow chart of the laser processing method by means of the polygon mirror according to the present invention.

First, in order to start to process the object, control parameters such as a rotation velocity of the polygon mirror 10 and a transfer velocity of the stage 30 need to be established according to the type of the object to be processes, by means of the input unit 120 after settling the object on the stage 30 (step S10). This establishment of the control parameters may be easily accomplished by invoking a menu from the storage unit 170 storing the menu of preliminarily registered information about the kinds of the objects and processes (e.g., cutting, grooving, and so on).

Once the control parameters are completely established, the polygon mirror driver 130 enables the polygon mirror 10 to rotate with a predetermined velocity (step S20) and the stage transfer unit 150 moves the stage 30 with a predetermined velocity (step S30). During this, the controller 10 also enables the laser generator 140 to emit the laser beam (step S40).

According to those operations, the laser beam emitted from the laser generator 140 is incident on the reflection plane of the polygon mirror 10, covering more than two reflection planes to accomplish the loss rate over 100% for one reflection plane.

And then, the laser beam is divisionally reflected on each reflection plane, condensed on the lens 20, and vertically irradiated on the object 40 (step S50). As they are different in incident positions on the reflection planes, the laser beam is divisionally reflected on the different positions of the object 40 and thereby each energy of each laser beam irradiated on the object becomes lower. In addition, since even the laser beams reflected on the corners of the reflection planes are all condensed on the lens 20 without loss, energy loss is prevented.

As shown in FIG. 7, with addition of the beam expander 210 and the beam transformer 220, the laser beam is irradiated on the object 40 with the elliptical pattern in section, and a major axis of the elliptical section should be aligned with the processing direction while a minor axis of the elliptical section corresponds to the width of cutout processing.

In the laser processing apparatus, as the polygon mirror 10 rotates with a constant velocity, the plural divided laser beams are overlapped on the same processing plane of the object 40. Further, the processing speed is able to be accelerated by transferring the stage 30, on which the object 40 is settled, toward the reverse of the rotating direction of the polygon mirror 10.

Although the present invention has been described in connection with the embodiment of the present invention illustrated in the accompanying drawings, it is not limited thereto. It will be apparent to those skilled in the art that various substitution, modifications and changes may be thereto without departing from the scope and spirit of the invention.

As described above, according to the laser processing apparatus processing an object by a polygon mirror, the processing efficiency and yields of the object are to be improved by repeatedly processing the object in low energy using the characteristic of energy reduction due to the division of the laser beam at the corners of the polygon mirror. Moreover, it prevents energy loss at the corners of the reflection planes of the polygon mirror by adjusting the size of the laser beam to cover more than two reflection planes of the polygon mirror.

What is claimed is:

1. A laser processing apparatus processing an object by a laser beam, comprising:

a laser generator emitting a laser beam with a predetermined diameter;

a polygon mirror rotating on an axis with plural reflection planes and reflecting the laser beam emitted from the laser generator on the reflection planes whose number is adjusted to make plural reflection planes be covered by laser beam;

a lens condensing the laser beam reflected on the polygon mirror and irradiating the laser beam on the object;

a polygon mirror driver actuating the polygon mirror with a predetermined angular velocity;

a stage settling the object thereon; and a stage transfer unit moving the stage toward the reverse of a rotating direction of the polygon mirror wherein the number of the reflecting planes, N of the polygon mirror, is established to keep a loss rate on each reflection plane over 100%, when a loss angle formed by a laser beam with reduced energy for the whole laser beam incident on the reflection plane of the polygon mirror is defined as $$t_\theta = \arccos\left[1 - \frac{1}{2R^2}\left\{\sqrt{R^2 - (R-h)^2} - \sqrt{R^2 - (R-h-D)^2} + D^2\right\}\right]; \text{ and}$$

the loss rate on the reflection plane of the polygon mirror is defined as $$t_r = \frac{C2}{C1} = \frac{t_\theta N}{2\pi} \times 100(\%),$$

where a radius of a circumcircle of the polygon mirror is R; the diameter of the laser beam is D; and a vertical height from the center of the polygon mirror to the center of the laser beam incident on the polygon mirror is h; an arc length corresponding to the reflection plane on which the laser beam is irradiated is C1: and an arc length for the portion of the loss angle is C2.

2. The laser processing apparatus according to claim 1, which further comprises a beam transformer converting a sectional pattern of the laser beam condensed on the lens into an ellipse.

3. The laser processing apparatus according to claim 2, wherein the beam transformer makes a major axis of the ellipse conform to a processing direction of the object.

4. The laser processing apparatus according to claim 3, wherein a minor axis of the ellipse corresponds to a processing width of the object and is variable in accordance with a kind of the object and a pattern of processing.

* * * * *